US009614456B2

(12) United States Patent
Yuasa

(10) Patent No.: US 9,614,456 B2
(45) Date of Patent: Apr. 4, 2017

(54) POWER CONVERSION APPARATUS THAT PREVENTS INRUSH CURRENT AND AIR-CONDITIONING APPARATUS USING THE SAME

(71) Applicant: Kenta Yuasa, Tokyo (JP)

(72) Inventor: Kenta Yuasa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 14/646,072

(22) PCT Filed: Jan. 7, 2013

(86) PCT No.: PCT/JP2013/050022
§ 371 (c)(1),
(2) Date: May 20, 2015

(87) PCT Pub. No.: WO2014/106894
PCT Pub. Date: Jul. 10, 2014

(65) Prior Publication Data
US 2015/0280603 A1 Oct. 1, 2015

(51) Int. Cl.
*H02M 1/36* (2007.01)
*H02M 1/12* (2006.01)
(Continued)

(52) U.S. Cl.
CPC ............. *H02M 5/458* (2013.01); *H02M 1/36* (2013.01); *H02M 3/156* (2013.01); *H02M 7/125* (2013.01);
(Continued)

(58) Field of Classification Search
CPC ........ H02M 1/36; H02M 3/156; H02M 3/158; H02M 3/1582; H02M 5/40; H02M 5/42;
(Continued)

(56) References Cited

U.S. PATENT DOCUMENTS 4,438,385 A * 3/1984 Sato .................... H02P 9/305
322/23
5,834,924 A * 11/1998 Konopka ............... H02H 9/001
323/222
(Continued)

FOREIGN PATENT DOCUMENTS

DE     40 36 062 A1    5/1992
JP     H09-019154 A    1/1997
(Continued)

OTHER PUBLICATIONS

Machine Translation—JP Publication No. 09-019154 (Publication Date—Jan. 17, 1997).*
(Continued)

*Primary Examiner* — Jessica Han
*Assistant Examiner* — David A. Singh
(74) *Attorney, Agent, or Firm* — Posz Law Group, PLC

(57) ABSTRACT

A power conversion apparatus includes: a first smoothing capacitor and a second smoothing capacitor connected in parallel to each other, an inrush current preventing circuit connected in series to the first smoothing capacitor, the inrush current preventing circuit including an inrush preventing resistor for suppressing an inrush current and a first relay connected in parallel to the inrush preventing resistor; a second relay connected in series to the second smoothing capacitor; an inverter circuit for converting the output smoothed by the first smoothing capacitor and the second smoothing capacitor into an AC voltage and outputting the AC voltage to a load; and relay controlling means for controlling a switching operation of the first relay and the second relay.

12 Claims, 5 Drawing Sheets

(51) Int. Cl.
*H02M 7/12* (2006.01)
*H02M 5/458* (2006.01)
*H02M 1/00* (2006.01)
*H02M 3/156* (2006.01)

(52) U.S. Cl.
CPC ............ *H02M 2001/0038* (2013.01); *H02M 2001/123* (2013.01); *H02P 2201/09* (2013.01)

(58) Field of Classification Search
CPC ........ H02M 5/44; H02M 5/453; H02M 5/458; H02M 5/4585; H02M 2001/0038; H02M 2001/123; H02M 7/125; H02P 2201/09; H02P 2201/11
USPC .............................................. 363/13, 34, 37
See application file for complete search history.

(56) References Cited

U.S. PATENT DOCUMENTS

| | | | | |
|---|---|---|---|---|
| 5,872,430 | A * | 2/1999 | Konopka | H05B 41/28 315/219 |
| 5,994,881 | A * | 11/1999 | Miyazaki | B60K 6/26 290/40 C |
| 6,157,097 | A * | 12/2000 | Hirose | H02M 7/062 307/125 |
| 2007/0137945 | A1 | 6/2007 | Takahashi et al. | |
| 2007/0228837 | A1 * | 10/2007 | Nielsen | H02J 9/062 307/82 |
| 2011/0204870 | A1 * | 8/2011 | Tsutada | H01H 33/593 323/355 |

FOREIGN PATENT DOCUMENTS

| | | |
|---|---|---|
| JP | H11-285274 A | 10/1999 |
| JP | 2003-079152 A | 3/2003 |
| JP | 2009-011042 A | 1/2009 |
| JP | 2009-060705 A | 3/2009 |
| JP | 2010-110085 A | 5/2010 |
| JP | 4799512 B2 | 8/2011 |
| WO | 2007/020692 A1 | 2/2007 |

OTHER PUBLICATIONS

Machine Translation—JP Publication No. 2003-079152 (Publication Date—Mar. 14, 2003).*
International Search Report of the International Searching Authority mailed Apr. 2, 2013 for the corresponding international application No. PCT/JP2013/050022 (and English translation).
Extended European Search Report for the corresponding EP application No. 13870095.0 was issued on Jul. 22, 2016.

* cited by examiner

F I G. 4
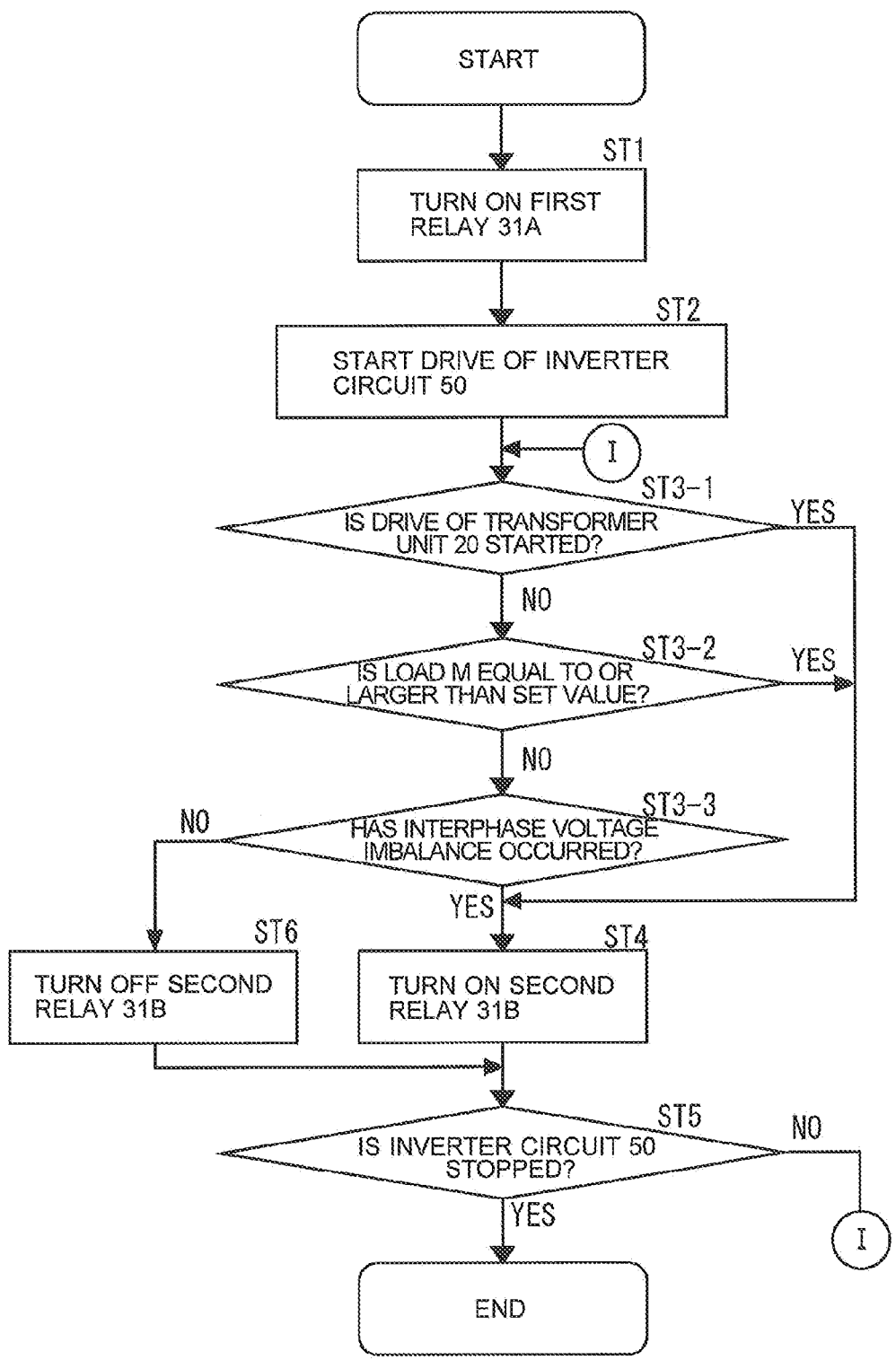

POWER CONVERSION APPARATUS THAT PREVENTS INRUSH CURRENT AND AIR-CONDITIONING APPARATUS USING THE SAME

CROSS REFERENCE TO RELATED APPLICATION

This application is a U.S. national stage application of International Application No. PCT/JP2013/050022 filed on Jan. 7, 2013, the disclosure of which is incorporated by reference.

TECHNICAL FIELD

The present invention relates to a power conversion apparatus having a function of preventing an inrush current, and to an air-conditioning apparatus using the power conversion apparatus.

BACKGROUND ART

In air-conditioning apparatus and refrigerators, there is known a power conversion apparatus configured to drive, by an inverter, a motor to be used for a compressor, a fan, or the like. Further, a smoothing capacitor is connected to an input stage of the inverter, to thereby stabilize a voltage to be output to the inverter. A commercial alternating current is converted into a direct current by a rectifier, and then the current is smoothed by the smoothing capacitor. After that, the current is converted into AC power with an arbitrary voltage and frequency by the inverter, and then the power is supplied to a load such as a motor.

This smoothing capacitor is charged when the power is turned on, and an inrush current that is several times as large as that in the normal state flows from an AC power supply. Various methods are proposed as a method of suppressing such an inrush current (for example, see Patent Literatures 1 to 3). In Patent Literature 1, there is proposed a configuration in which an inrush current preventing circuit including an inrush preventing resistor and a relay is connected in series to the smoothing capacitor, to thereby prevent charging or discharging of the inrush current into or from the smoothing capacitor. In Patent Literature 2, there is proposed a configuration in which a plurality of sets of combination of a relay and a reactor connected in series are connected in parallel to each other, and an inrush current preventing circuit including a relay circuit and a resistor is also formed. In Patent Literature 3, there is proposed a configuration in which a relay is connected in series to a smoothing capacitor through which a small amount of current flows so as to downsize the relay, and a period is provided in which no ripple current is caused to flow through the smoothing capacitor.

CITATION LIST

Patent Literature

Patent Literature 1: Japanese Unexamined Patent Application Publication No. 2009-11042
Patent Literature 2: Japanese Unexamined Patent Application Publication No. 2010-110085
Patent Literature 3: Japanese Patent No. 4799512

SUMMARY OF INVENTION

Technical Problem

However, as in Patent Literatures 1 to 3, when the inverter circuit is driven in a state in which the resistor and the smoothing capacitor are connected to each other, there arises a problem in that power is inhibited from being stably supplied to the motor under a state in which the smoothing capacitor is not used. Further, there arises a problem of reduced robustness to a change in usage environment, such as at the time of power supply imbalance in which the voltage pulsation is increased than usual.

The present invention has been made in order to solve the above-mentioned problems, and has an object to provide a power conversion apparatus and an air-conditioning apparatus using the same, which are capable of securing the robustness to the change in usage environment while stably supplying power.

Solution to Problem

According to one embodiment of the present invention, there is provided a power conversion apparatus, including: a rectifier for rectifying an AC voltage supplied from an AC power supply; a first smoothing capacitor and a second smoothing capacitor connected in parallel to each other, configured to smooth and charge an output from the rectifier; an inrush current preventing circuit connected in series to the first smoothing capacitor, the inrush current preventing circuit including: an inrush preventing resistor for suppressing an inrush current; and a first relay connected in parallel to the inrush preventing resistor; a second relay connected in series to the second smoothing capacitor; an inverter circuit for converting the output smoothed by the first smoothing capacitor and the second smoothing capacitor into an AC voltage and outputting the AC voltage to a load; and relay controlling means for controlling a switching operation of each of the first relay and the second relay, the relay controlling means being configured to: set, before drive of the inverter circuit is started, the first relay to an on state and the second relay to an off state; and control, while the inverter circuit is driven, an operation of the second relay based on a state of the load.

Advantageous Effects of Invention

According to the power conversion apparatus of the one embodiment of the present invention, the second relay is set to the on state based on the operation state. Thus, it is possible to prevent application of an excessive load only to a specific smoothing capacitor, and to extend the life of the entire product.

BRIEF DESCRIPTION OF DRAWINGS

FIG. 4 is a schematic view illustrating another example of the state in which the smoothing capacitors of FIG. 1 are mounted on the board.

DESCRIPTION OF EMBODIMENTS

Embodiment 1

Figure 1:
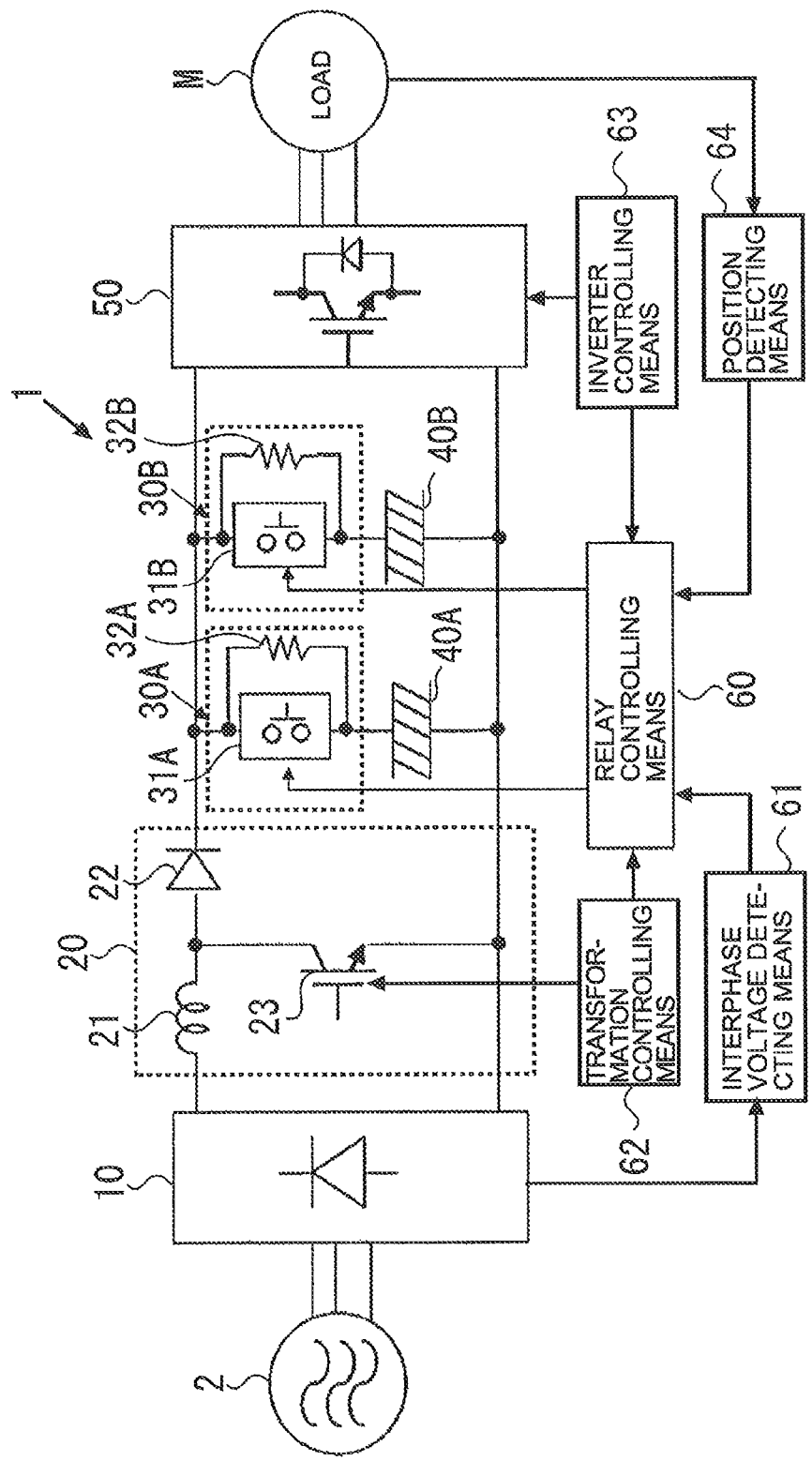
FIG. 1 is a circuit diagram illustrating a power conversion apparatus according to Embodiment 1 of the present invention.

Now, with reference to the drawings, a power conversion apparatus according to an embodiment of the present invention is described. FIG. 1 is a circuit diagram illustrating a power conversion apparatus according to Embodiment 1 of the present invention. With reference to FIG. 1, a power conversion apparatus 1 is described. The power conversion apparatus 1 of FIG. 1 includes a rectifier 10, a transformer unit 20, a plurality of inrush current preventing circuits 30A and 30B, a first smoothing capacitor 40A, a second smoothing capacitor 40B, and an inverter circuit 50. The rectifier 10 is configured to convert an AC voltage (for example, AC 200 V) of a three-phase AC power supply 2 into a DC voltage, and is formed of, for example, a three-phase full-wave rectifier in which six diodes are bridge-connected to each other. Further, the rectifier 10 is connected to interphase voltage detecting means 61 for detecting imbalance in interphase voltage of the three phases of the AC power supply 2. Note that, various known technologies can be used as the method of detecting the interphase voltage imbalance in the interphase voltage detecting means 61.

The transformer unit 20 is a boost converter circuit (boost chopper circuit) for boosting the DC voltage output from the rectifier 10 to, for example, DC 350 V or the like, and includes a boosting reactor 21, a backflow preventing diode 22, and a switching element 23. The switching element 23 is configured to input a drive signal with a predetermined duty ratio, and the switching operation thereof is controlled by transformation controlling means 62. Note that, the switching element 23 may be formed of a semiconductor element such as MOFET and IGBT, and also with use of a wide band-gap semiconductor such as a silicon carbide (SiC) element, gallium nitride (GaN), or a diamond element, which has a large band gap as compared to that of a silicon (Si) element.

When the switching element 23 is turned on, a voltage rectified by the rectifier 10 is applied to the reactor 21, and electrical connection to the backflow preventing diode 22 is inhibited. On the other hand, when the switching element 23 is turned off, the backflow preventing diode 22 is electrically connected, and a voltage in an opposite direction to that when the switching element 23 is turned on is induced to the reactor 21. At this time, the energy stored in the reactor 21 while the switching element 23 is turned on is transferred to the smoothing capacitor (40A, 40B) side while the switching element 23 is turned off. Control on the on-duty of the switching element 23 enables control on the output voltage of the transformer unit 20.

The first smoothing capacitor 40A and the second smoothing capacitor 40B are each configured to smooth and charge the output from the transformer unit 20, and are connected in parallel to each other. The first smoothing capacitor 40A and the second smoothing capacitor 40B are connected in series to the inrush current preventing circuits 30A and 30B, respectively. The inrush current preventing circuits 30A and 30B are configured to suppress inrush currents to the smoothing capacitors 40A and 40B, respectively. The inrush current preventing circuit 30A includes a first relay 31A and an inrush preventing resistor 32A, and the first relay 31A and the inrush preventing resistor 32A are connected in parallel to each other. Similarly, the inrush current preventing circuit 30B includes a second relay 31B and an inrush preventing resistor 32B, and the second relay 31B and the inrush preventing resistor 32B are connected in parallel to each other. In other words, the second relay 31B is connected in series to the second smoothing capacitor 40B, and connected in parallel to the inrush preventing resistor 32B.

Therefore, when each of the relays 31A and 31B is in the off state, each of the smoothing capacitors 40A and 40B is connected to the transformer unit 20 via each of the inrush preventing resistors 32A and 32B. Therefore, almost no current flows through each of the smoothing capacitors 40A and 40B. On the other hand, when each of the relays 31A and 31B is in the on state, a current flows from the transformer unit 20 through each of the smoothing capacitors 40A and 40B. As described above, turning on/off of each of the relays 31A and 31B enables selection of each of the smoothing capacitors 40A and 40B through which the current flows. For example, when the first relay 31A is in the on state and the second relay 31B is in the off state, on the second relay 31B side, the transformer unit 20 is connected in series to the second smoothing capacitor 40B via the inrush preventing resistor 32B. Therefore, a current hardly flows through the second smoothing capacitor 40B, and thus the current flows on the first smoothing capacitor 40A side. The operation of each of the relays 31A and 31B is controlled by relay controlling means 60.

The inverter circuit 50 is configured to convert the DC power smoothed and charged by each of the smoothing capacitors 40A and 40B into AC power, and includes a plurality of switching elements. The inverter circuit 50 is connected to, for example, a load M such as a motor of a compressor of an air-conditioning apparatus, to thereby supply an AC current with a predetermined frequency to the load M. The operation of the inverter circuit 50 is controlled by inverter controlling means 63, and the frequency of the power output from the inverter circuit 50 to the load M is controlled based on the drive signal output from the inverter controlling means 63. Note that, the motor serving as the load M is connected to position detecting means 64 for detecting the rotation speed.

Figure 2:
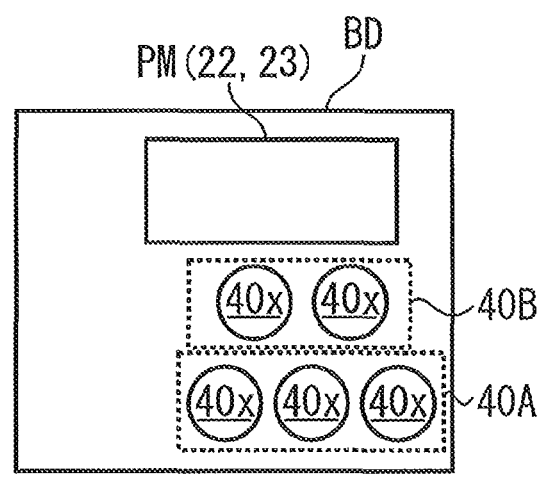
FIG. 2 is a schematic view illustrating an example of a state in which the smoothing capacitors of FIG. 1 are mounted on a board.

FIG. 2 is a schematic view illustrating an example in which the power conversion apparatus 1 of FIG. 1 is mounted on a board BD. In the power conversion apparatus 1 of FIG. 2, a power module PM and the respective smoothing capacitors 40A and 40B are mounted on the same board BD. Note that, on the board BD, other electronic components (not shown) constructing the power conversion apparatus 1 are mounted. As each of the smoothing capacitors 40A and 40B for voltage stabilization, instead of the board mounting-type capacitor illustrated in FIG. 2, there is known a capacitor of a screw terminal type, which is not mounted on the board. In general, the screw terminal type is more expensive than the board mounting type, and is required to be mounted on a controller separately from the board, which deteriorates the workability. Therefore, the board mounting-type capacitor of FIG. 2 tends to be superior in cost and workability.

The power module PM incorporates the above-mentioned backflow preventing diode 22 and switching element 23. On the other hand, each of the smoothing capacitors 40A and 40B has a configuration in which a plurality of capacitor elements (electrolytic capacitors) 40x are connected in parallel to each other. Of those, the second smoothing capacitor 40B is arranged adjacent to the power module PM, and the first smoothing capacitor 40A is arranged across the second smoothing capacitor 40B from the power module PM. Therefore, the first smoothing capacitor 40A is mounted so as to be more distanced from the power module PM than the second smoothing capacitor 40B.

Figure 3:
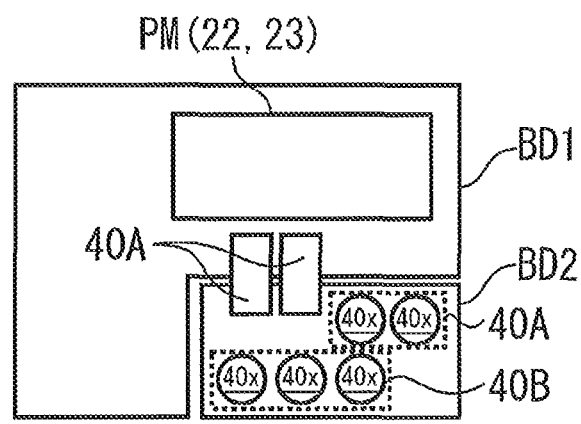
FIG. 3 is a flow chart illustrating an operation example of the power conversion apparatus of FIG. 1.

Further, FIG. 2 exemplifies a case where the power module PM and the respective smoothing capacitors 40A and 40B are mounted on the same board BD, but as illustrated in FIG. 3, a plurality of boards BD1 and BD2 may be used. In FIG. 3, the power module PM is mounted on the first board BD1, and the plurality of capacitor elements 40x constructing the respective smoothing capacitors 40A and 40B are mounted on the second board BD2. Further, the first board BD1 and the second board BD2 are electrically connected to each other by copper bars 14 or the like.

When the power module PM and the respective smoothing capacitors 40A and 40B are electrically connected to each other with use of the copper bars 14 as described above, the copper bar 14 itself serves as a radiator plate. Therefore, there is an effect that heat transfer is less liable to occur, and thus the life of each of the smoothing capacitors 40A and 40B can be extended. Note that, a similar effect can be obtained even in a configuration in which not only the respective smoothing capacitors 40A and 40B but also other components such as the respective relays 31A and 31B are mounted on the second board BD2. Further, service replacement of only the respective smoothing capacitors 40A and 40B, which tend to have a shorter life than other components, is possible, and thus only the target part can be replaced.

In view of this, in the power conversion apparatus 1, when a ripple current is input to each of the smoothing capacitors 40A and 40B, the core temperature inside each of the smoothing capacitors 40A and 40B may increase, which may cause deterioration in life or, in the worst case, failure due to explosion-proof valve activation. The ripple current is generated depending on the operation state of the load M. Examples of the operation state of the load M include a case where voltage transformation is carried out in the transformer unit 20, a case where the load of the motor M serving as the load increases, and a case where imbalance is caused in the interphase voltage.

Further, when the power conversion apparatus 1 is driven, the power module PM generates heat. In particular, heat generation becomes remarkable when SiC described above is used as the semiconductor element. The heat generation of the power module PM adversely affects the respective smoothing capacitors 40A and 40B. As the mounting position of the capacitor element 40x is closer to the power module PM, the capacitor element 40x is more affected by the heat generation of the power module PM. For example, in the case of the mounting positions as illustrated in FIGS. 2 and 3, in the respective smoothing capacitors 40A and 40B, the second smoothing capacitor 40B nearby the power module PM is more affected by the heat generation than the first smoothing capacitor 40A farther from the heat generating member. Therefore, the life of the second smoothing capacitor 40B receiving a larger amount of heat is shorter than the life of the first smoothing capacitor 40A. As described above, a difference in amount of heat received from the power module PM is caused depending on the mounting positions of the capacitor elements 40x, and thus a specific capacitor has a shorter life.

In view of this, in order to disperse the influence by the ripple current and the influence by the heat from the outside to the plurality of smoothing capacitors 40A and 40B, the relay controlling means 60 of FIG. 1 has a function of controlling on/off of each of the first relay 31A and the second relay 31B. Specifically, the relay controlling means 60 sets the first relay 31A of the inrush current preventing circuit 30A to the on state and the second relay 31B to the off state before the drive of the inverter circuit 50 is started. Then, in the plurality of smoothing capacitors 40A and 40B, the first smoothing capacitor 40A short-circuits the first relay 31A to be connected to the transformer unit 20, and the second smoothing capacitor 40B is connected to the transformer unit 20 via the inrush preventing resistor 32B.

As described above, the first smoothing capacitor 40A receiving a smaller amount of heat from the power module PM may be more secured in life than the second smoothing capacitor 40B. In view of this, when the operation is started (when the power is turned on), the first relay 31A on the first smoothing capacitor 40A side is controlled to be in the on state. With this, the usage period of the second smoothing capacitor 40B receiving influence of heat from the power module PM is reduced to extend its life. In this manner, the life of the first smoothing capacitor 40A can become close to the life of the second smoothing capacitor 40B.

Then, while the inverter circuit 50 is driven, the relay controlling means 60 controls the on/off operation of the second relay 31B based on the state of the load M. Specifically, the relay controlling means 60 controls the on/off operation of the second relay 31B based on the operation states described below, such as the drive state of the transformer unit 20, the state of the load M, and the state of the imbalance in the interphase voltage.

While the inverter circuit 50 is driven, when the operation of the transformer unit 20 is started based on the state of the load M, the relay controlling means 60 controls the second relay 31B to be in the on state. For example, the transformation controlling means 62 controls the switching element 23 to be not driven when the rotation speed of the motor M serving as the load is low or medium, but to be driven in a case of a high-speed operation. In this case, in order to operate the transformer unit 20 and boost the voltage, for example, high-speed switching of about 20 kHz is necessary. Then, a ripple current in which the 20-kHz component caused by the switching is dominant flows, and the ripple current flows in a larger amount than that when the transformer unit 20 is not operated. In view of this, when it is determined that the transformation controlling means 62 has caused the transformer unit 20 to operate, the relay controlling means 60 controls the second relay 31B to be turned on. Then, the ripple current flows through not only the first smoothing capacitor 40A but also the second smoothing capacitor 40B in a dispersed manner. Thus, heat generation due to the ripple current can be dispersed. Therefore, the life on the first smoothing capacitor 40A side can be prevented from being shortened due to the ripple current.

While the inverter circuit 50 is driven, when the rotation speed of the load M becomes equal to or larger than a set value, the relay controlling means 60 controls the second relay 31B to be in the on state. When the load to the inverter circuit 50 increases, a current from the first smoothing capacitor 40A to the load M positioned at the output stage of the inverter circuit 50 increases. Along therewith, the current charged to the first smoothing capacitor 40A from the transformer unit 20 side increases, and hence the ripple current flowing through the first smoothing capacitor 40A also increases. In view of this, when it is determined that the rotation speed detected by the position detecting means 64 is equal to or larger than the set value, the relay controlling means 60 controls the second relay 31B to be turned on. Then, the ripple current flows through not only the first smoothing capacitor 40A but also the second smoothing capacitor 40B in a dispersed manner. Thus, heat generation due to the ripple current can be dispersed to the plurality of smoothing capacitors 40A and 40B. Therefore, the life on the first smoothing capacitor 40A side can be prevented from being shortened due to the ripple current.

Note that, on the low-speed side having a small inverter load, even when the second relay 31B is in the off state, the first smoothing capacitor 40A is in the on state. Therefore, as compared to the case where, on the low-speed side, the inverter circuit 50 is operated without connecting the smoothing capacitor 40A as in the related art, it is possible to stabilize motor control in the low-speed region and reduce the influence applied to the motor control due to an environmental change such as power supply imbalance. A small amount of ripple current flows through the first smoothing capacitor 40A during low speed. Therefore, operation is possible with the first smoothing capacitor 40A that generates a small amount of heat without using the second smoothing capacitor 40B.

Note that, in order to increase the number of revolutions of the load (motor) M, it is also necessary to increase the driving frequency output from the inverter controlling means 63 to the inverter circuit 50. Therefore, the relay controlling means 60 may set the second relay 31B to the on state when the driving frequency of the inverter controlling means 63 is equal to or larger than a set value.

While the inverter circuit 50 is driven, when a difference in voltages of the three phases detected by the interphase voltage detecting means 61 based on the state of the load M is equal to or larger than a set value, the relay controlling means 60 controls the second relay 31B to be in the on state. For example, when the load (motor) M is operated at a light load, an amount of current flowing through the load M reduces, and thus the terminal voltage of the first smoothing capacitor 40A simply reduces gently. Therefore, a phase through which no input current flows may be generated in the lowest phase of the voltage in the AC power supply 2. In this case, due to the pulsation of the voltage applied to each of the smoothing capacitors 40A and 40B, a biased current is generated during charging of each of the smoothing capacitors 40A and 40B, resulting in increase in the ripple current. In view of this, when the difference in the voltages of the three phases is equal to or larger than the set value, the second relay 31B is set to the on state, to thereby disperse the heat generation due to the ripple current. Thus, the life on the first smoothing capacitor 40A side can be prevented from being shortened due to the ripple current.

As described above, by switching the second relay 31B on and off so as to control the time of the current flowing through each of the smoothing capacitors 40A and 40B, the lives of the respective smoothing capacitors 40A and 40B may become close to each other. As conditions for turning on the second relay 31B, three patterns of the converter operation, the inverter load, and the power supply imbalance are exemplified, but the conditions for turning on and off the second relay 31B may be determined by a method suitable for the application. In a case of such an air-conditioning apparatus that there is a condition that increases the ripple current other than those described above, a new condition for turning on the second relay 31B may be provided without any problem.

Note that, how much the ripple current increases can be determined by a circuit simulator or values actually measured by an experiment. Therefore, the above-mentioned various set values are set based on data obtained from the circuit simulator or the like. In particular, when the above-mentioned set values are calculated, the set values are set so that the difference between the life of the first smoothing capacitor 40A that receives the influence of the ripple current and the life of the second smoothing capacitor 40B that receives the influence of heat of the power module PM is minimized (the lives are substantially the same).

Specifically, first, the temperature increase values of the respective smoothing capacitors 40A and 40B, which are required for calculation of lives, are calculated. For example, the ripple current may be calculated by the circuit simulator, and the temperature increase values of the respective smoothing capacitors 40A and 40B with respect to the calculated ripple current may be calculated. Alternatively, the amount of heat generated by the respective smoothing capacitors 40A and 40B depends on the arrangement and configuration on the board, therefore, the data on the temperature increase of the respective smoothing capacitors 40A and 40B in the above-mentioned various operation states may be actually measured in advance, to thereby obtain accurate temperature increase values.

Next, it is generally known that the characteristic change of the capacitor progresses through a chemical reaction and follows the Arrhenius law. Thus, with use of the above-mentioned temperature increase value, the life of the first smoothing capacitor 40A is calculated based on Expression (1). Note that, in Expression (1), $L_x$ represents an estimated life, $L_0$ represents a prescribed life when a rated ripple current is caused to flow with an increased temperature ($T_0$), and $T_x$ represents temperature during use.

$$L_x = L_0 \times 2^{(T_0 - T_x)/10} \times 2^{(\Delta T_0 - \Delta T)/5} \qquad [\text{Math. 1}]$$

As represented in Expression (1), as the period in which the ripple current $L_0$ flows through the first smoothing capacitor 40A becomes shorter, the self-heat generation amount decreases and the life is extended. With use of Expression (1), the life of the first smoothing capacitor 40A can be calculated based on temperature and time during which this temperature is applied. On the other hand, the life of the second smoothing capacitor 40B when receiving the heat generated by the power module PM can be measured in advance by a circuit simulator or actually measured values.

Then, the above-mentioned various set values are calculated so that the life of the first smoothing capacitor 40A to which the ripple current is input and the life of the second smoothing capacitor 40B that receives heat from the outside such as from the power module PM described above are equal to each other. Then, the relay controlling means 60 controls the second relay 31B with use of the calculated set values. With this, it is possible to prevent the life of one of the plurality of smoothing capacitors 40A and 40B from being extremely short, and thus the life of the product itself can be extended.

FIG. 4 is a flow chart illustrating an operation example of the power conversion apparatus 1 of FIG. 1. With reference to FIGS. 1 to 4, the operation example of the power conversion apparatus 1 is described. First, when the power of the power conversion apparatus 1 is turned on, the first relay 31A and the second relay 31B are set to the off state, which prevents the inrush current. Then, before the inverter circuit 50 is driven, the first relay 31A is set to the on state (Step ST1). After that, the inverter controlling means 63 starts the drive of the inverter circuit 50 with a predetermined driving frequency (Step ST2).

Then, while the power conversion apparatus 1 is operated, the second relay 31B is controlled to be in the on state based on the operation state (Steps ST3-1 to ST3-3). That is, when the operation state of the air-conditioning apparatus transitions from the low-speed operation state to the high-speed operation state, and the transformer unit 20 starts to operate so as to boost the voltage (Step ST3-1), when the load of the inverter increases (Step ST3-2), and when an imbalance is caused in the interphase voltage due to the change in power supply environment (Step ST3-3), the second relay 31B is set to the on state (Step ST4). Note that, even when the second relay 31B is in the off state, the second smoothing capacitor 40B is in a charged state via the inrush preventing resistor 32B. Therefore, it is possible to prevent the inrush current from being generated at the moment when the second relay 31B is switched from the off state to the on state.

Then, while the inverter circuit 50 is operated (Step ST5), the above-mentioned determination on switching on or off the second relay 31B is periodically repeated (Steps ST3-1 to ST5). Further, under a state in which the second relay 31B is turned on, when it is determined that the ripple current is not generated (Steps ST3-1 to ST3-3), the relay controlling means 60 operates the second relay 31B so as to be switched from the on state to the off state (Step ST6). In this manner, in the second smoothing capacitor 40B, which tends to have a shorter life due to the thermal load from the outside, the input of the ripple current can be suppressed (see FIG. 2).

As described above, the switching of the second relay 31B is controlled based on the operation state. In this manner, while stably supplying power, the robustness to the change in usage environment, such as at the time of power supply imbalance in which the voltage pulsation is increased than usual, can be secured. That is, when the power conversion apparatus 1 is operated, the first relay 31A is controlled to be in the on state, and hence the motor can be stably driven under a state in which the first smoothing capacitor 40A always functions. Thus, deterioration of motor control can be prevented. Further, the second relay 31B is switched in accordance with change in usage environment such as at the time of power supply imbalance. Therefore, the robustness to the change in usage environment and the like can be secured.

Further, in the plurality of smoothing capacitors 40A and 40B, the first smoothing capacitor 40A farther from the power module PM that is a heat generating member is preferentially used, and the second smoothing capacitor 40B closer to the power module PM is controlled in electrical connection. Thus, the life on the second smoothing capacitor 40B side can be prevented from being shortened due to the ripple current. In other words, in such a manner that the influence due to the ripple current is received on the first smoothing capacitor 40A side and the influence due to the heat generation of the power module PM is received on the second smoothing capacitor 40B side, the load is dispersed to the plurality of smoothing capacitors 40A and 40B. Thus, the life of each of the smoothing capacitors 40A and 40B can be extended, and the product life can be extended. In particular, the set value for switching on the second relay 31B is set in advance by a circuit simulator or the like so that the lives of the respective smoothing capacitors 40A and 40B are substantially the same. With this, it is possible to prevent the life of one of the smoothing capacitors 40A and 40B from being extremely short, and thus the product life can be extended.

Further, a plurality of sets of combination of the plurality of inrush current preventing circuits 30A and 30B and the plurality of smoothing capacitors 40A and 40B are formed. Therefore, for example, even when an open fault occurs in one relay, the intermittent operation may be obtained by the other relay and the smoothing capacitor. Therefore, continuous operation as a controller can be given priority without abnormally stopping the load (air regulator or the like), and a temporary operation is possible until the failed board is replaced through service.

Further, at the output stage of the reactor 21, the respective relays 31A and 31B of the inrush current preventing circuits 30A and 30B are arranged in series to the first smoothing capacitors 40A and 40B. In this manner, a relay smaller in size and capacity than the related-art relay configured in series to the reactor can be used, and thus the cost can be reduced due to the reduction in mounting area and relay size.

Embodiment 2

Figure 5:
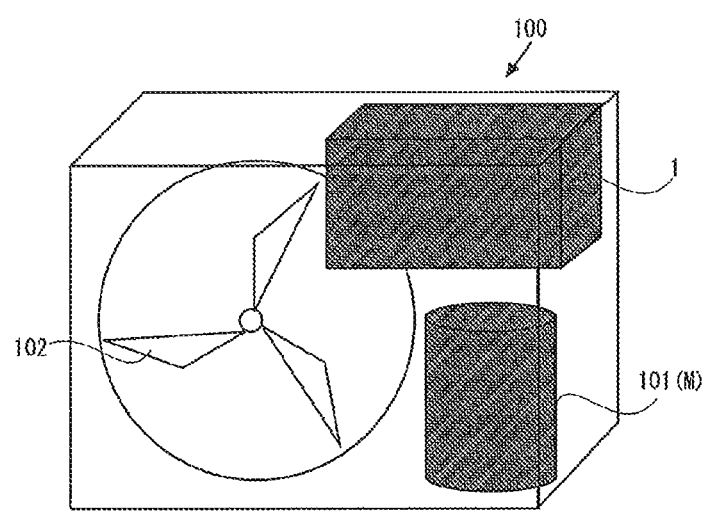
FIG. 5 is a schematic view illustrating an example of an outdoor unit of an air-conditioning apparatus using the power conversion apparatus according to the present invention.

FIG. 5 is a schematic view illustrating an example of an outdoor unit of an air-conditioning apparatus using the power conversion apparatus according to the present invention. As illustrated in FIG. 5, an outdoor unit 100 includes a compressor 101 and a fan 102, and the power conversion apparatus 1 drives a motor M of the compressor 101. Then, when the motor M of the compressor 101 is in the above-mentioned predetermined operation state, the second relay 31B is controlled to be in the on state.

As described above, the power conversion apparatus 1 is used in the outdoor unit 100 of the air-conditioning apparatus. Thus, as described above, when the inrush current preventing circuits 30A and 30B are formed for extending the lives of the respective smoothing capacitors 40A and 40B, while stably supplying power, the robustness to the change in usage environment, such as at the time of power supply imbalance in which the voltage pulsation is increased than usual, can be secured.

Embodiments of the present invention are not limited to the above-mentioned embodiments. For example, the embodiment exemplifies a case where the transformer unit 20 of FIG. 1 is a boost circuit, but the transformer unit 20 may be a buck circuit, or a buck-boost circuit capable of boosting and bucking the voltage. Further, the power conversion apparatus 1 may be configured without installing the transformer unit 20 so that the rectifier 10 and the inrush current preventing circuit 30 are directly connected to each other. Also in this case, the switching of the second relay 31B is controlled in accordance with the usage environment such as interphase voltage imbalance. With this, while securing stable drive of the load and robustness, the lives of the respective smoothing capacitors 40A and 40B can be extended.

Further, FIG. 1 exemplifies a case where the single first smoothing capacitor 40A and the single second smoothing capacitor 40B are connected in parallel to each other, but a plurality of first smoothing capacitors 40A may be further connected in parallel or a plurality of second smoothing capacitors 40B may be further connected in parallel.

Figure 6:
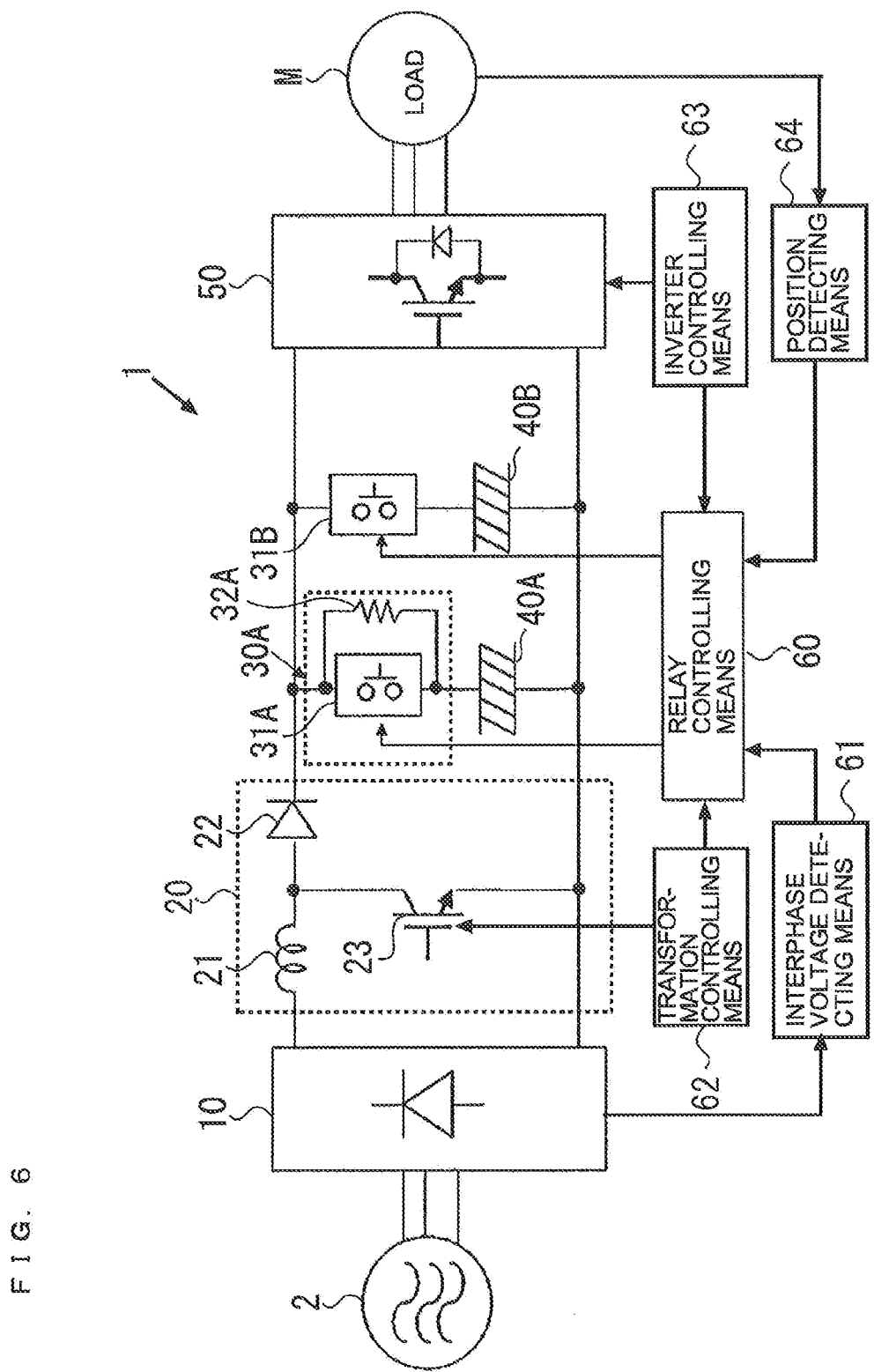
FIG. 6 is a circuit diagram illustrating a power conversion apparatus according to another embodiment of the present invention.

Further, as the states that generate the ripple current, the drive state of the transformer unit 20, the state of the load M, and the state of the interphase voltage imbalance are exemplified, but the present invention is not limited thereto. It is only necessary that the state that generates the ripple current may be detected to control on and off of the second relay 31B. Further, a case where the inrush current preventing circuit 30B is connected in series to the second smoothing capacitor 40B is exemplified, but as illustrated in FIG. 6, only the second relay 31B may be formed on the second smoothing capacitor 40B side without forming the inrush preventing resistor 32B. Also in this case, the second relay 31B is set to the on state at the predetermined operation states, and thus the ripple current to the first smoothing capacitor 40A can be suppressed.

Further, FIGS. 2 and 3 exemplify a case where the backflow preventing diode 22 and the switching element 23 of the transformer unit 20 are formed inside the power module PM, but the rectifier 10 and the inverter circuit 50 may also be formed of a wide band-gap semiconductor inside the power module PM. As described above, when a wide band-gap semiconductor capable of operating at high temperature is used, the power module PM itself can operate at high temperature. Thus, the heatsink can be downsized, or a heatsink-less configuration is possible.

That is, peripheral components having heat resistance against heat generated from the power module PM are required to be used. The peripheral components having heat resistance are expensive, which leads to cost increase. Therefore, it is difficult to use the power module PM in the high-temperature operation. In view of this, as described above, by controlling on and off of the second relay 31B, the load caused by the ripple current to the second smoothing capacitor 40B arranged nearby the power module can be suppressed, and thus, as the inverter circuit 50 and the like, a wide band-gap semiconductor such as SiC can be used. As described above, when the power module PM having a large amount of heat generation, which is formed of a wide band-gap semiconductor such as SiC, is used, the nearby second smoothing capacitor 40B is further affected by the heat, and hence this configuration can contribute to securing the life of the nearby capacitor.

Further, FIGS. 2 and 3 exemplify a case where the respective smoothing capacitors 40A and 40B are installed in different environments, but the respective smoothing capacitors 40A and 40B may be installed in the same heat environment. Also in this case, as illustrated in FIG. 4, the relay controlling means 60 controls the respective relays 31A and 31B, to thereby suppress shortening of lives of the respective smoothing capacitors 40A and 40B due to the ripple current. At this time, the relay controlling means 60 may store the usage periods of the respective smoothing capacitors 40A and 40B, may control the relay connected to the smoothing capacitor having a shorter usage period to be turned on when the operation starts, and may control on and off of the relay on the smoothing capacitor side having a longer usage period based on the above-mentioned operation states.

REFERENCE SIGNS LIST 1 power conversion apparatus 2 AC power supply 10 rectifier 14 copper bar 20 transformer unit 21 reactor 22 backflow preventing diode 23 switching element 30 inrush current preventing circuit 30A, 30B inrush current preventing circuit 31A first relay 31B second relay 31A, 32B inrush preventing resistor 40x capacitor element 40A first smoothing capacitor 40B second smoothing capacitor 50 inverter circuit 60 relay controlling means 61 interphase voltage detecting means 62 transformation controlling means 63 inverter con-trolling means 64 position detecting means 100 outdoor unit 101 compressor 102 fan BD, BD1, BD2 board M load (motor) PM power module

The invention claimed is:
1. A power conversion apparatus, comprising:
a rectifier for rectifying an AC voltage supplied from an AC power supply;
a first smoothing capacitor and a second smoothing capacitor connected in parallel to each other, and configured to smooth an output from the rectifier and charge thereof;
an inrush current preventing circuit connected in series to the first smoothing capacitor, the inrush current preventing circuit including
a first inrush preventing resistor for suppressing an inrush current, and
a first relay connected in parallel to the first inrush preventing resistor;
a second relay connected in series to the second smoothing capacitor;
an inverter circuit configured to convert the output smoothed by the first smoothing capacitor and the second smoothing capacitor into an AC voltage and output the AC voltage to a load;
an interphase voltage detecting device configured to detect an interphase voltage of the AC voltage supplied from the AC power supply, which is caused based on a state of the load;
a transformer unit arranged between the rectifier and each of the first smoothing capacitor and the second smoothing capacitor, and configured to transform a voltage output from the rectifier based on the state of the load and output the voltage; and
a relay controller configured to control a switching operation of each of the first relay and the second relay,
the relay controller being configured to
set, before drive of the inverter circuit is started, the first relay to an on state and the second relay to an off state,
control, while the inverter circuit is driven, an operation of the second relay based on all three of a state of the load, an operation of the transformer unit, and a difference in the interphase voltage detected by the interphase voltage detecting device, and
set the second relay to the on state when the interphase voltage is equal to or larger than a set value.

2. The power conversion apparatus of claim 1, wherein the relay controller is configured to set the second relay to the on state when the operation of the transformer unit is started.

3. The power conversion apparatus of claim 1,
wherein the transformer unit includes a chopper circuit including a reactor, a switching element, and a backflow preventing element, and
wherein the switching element and/or the backflow preventing element is formed of a wide band-gap semiconductor.

4. The power conversion apparatus of claim 1, further comprising a load detecting device configured to detect the state of the load,
wherein the relay controller is configured to control the operation of the second relay based on the state of the load detected by the load detecting device.

5. The power conversion apparatus of claim 4,
wherein the load comprises a motor,
wherein the load detecting device comprises a position detecting device configured to detect a rotation speed of the motor, and
wherein the relay controller is configured to set the second relay to the on state when the rotation speed of the motor is equal to or larger than a set value.

6. The power conversion apparatus of claim 1,
wherein the first smoothing capacitor and the second smoothing capacitor are mounted on a board together with a power module, and
wherein the first smoothing capacitor is mounted such that a distance to the power module to be longer than a distance from the second smoothing capacitor to the power module.

7. The power conversion apparatus of claim 1,
wherein the first smoothing capacitor and the second smoothing capacitor are mounted on a board together with a power module,
wherein the first smoothing capacitor is mounted such that the distance to the power module to be longer than the distance from the second smoothing capacitor to the power module, and
wherein the set value is set so that a difference between a life of the first smoothing capacitor and a life of the second smoothing capacitor is minimized.

8. The power conversion apparatus of claim 1, wherein a second inrush preventing resistor is connected in parallel to the second relay.

9. The power conversion apparatus of claim 1, wherein the controller is configured to control the operation of the second relay based on the state of the load changes from a first speed to a second speed that is higher than the first speed and the operation of the transformer unit starts to operate to boost a voltage as the load changes from the first speed to the second speed.

10. The power conversion apparatus of claim 9, wherein the controller is configured to control the operation of the second relay based on the interphase voltage detecting device detects an imbalance in the interphase voltage due to a change in a power supply environment.

11. The power conversion apparatus of claim 1, wherein the controller is configured to control the operation of the second relay based on the interphase voltage detecting device detects an imbalance in the interphase voltage due to a change in a power supply environment.

12. An air-conditioning apparatus, comprising:
the power conversion apparatus of claim 1; and
a motor to be driven by the power conversion apparatus.

* * * * *